Sept. 26, 1967  H. A. MASSEY  3,343,866
COLLAPSIBLE TRAILER
Filed Oct. 20, 1965  3 Sheets-Sheet 3

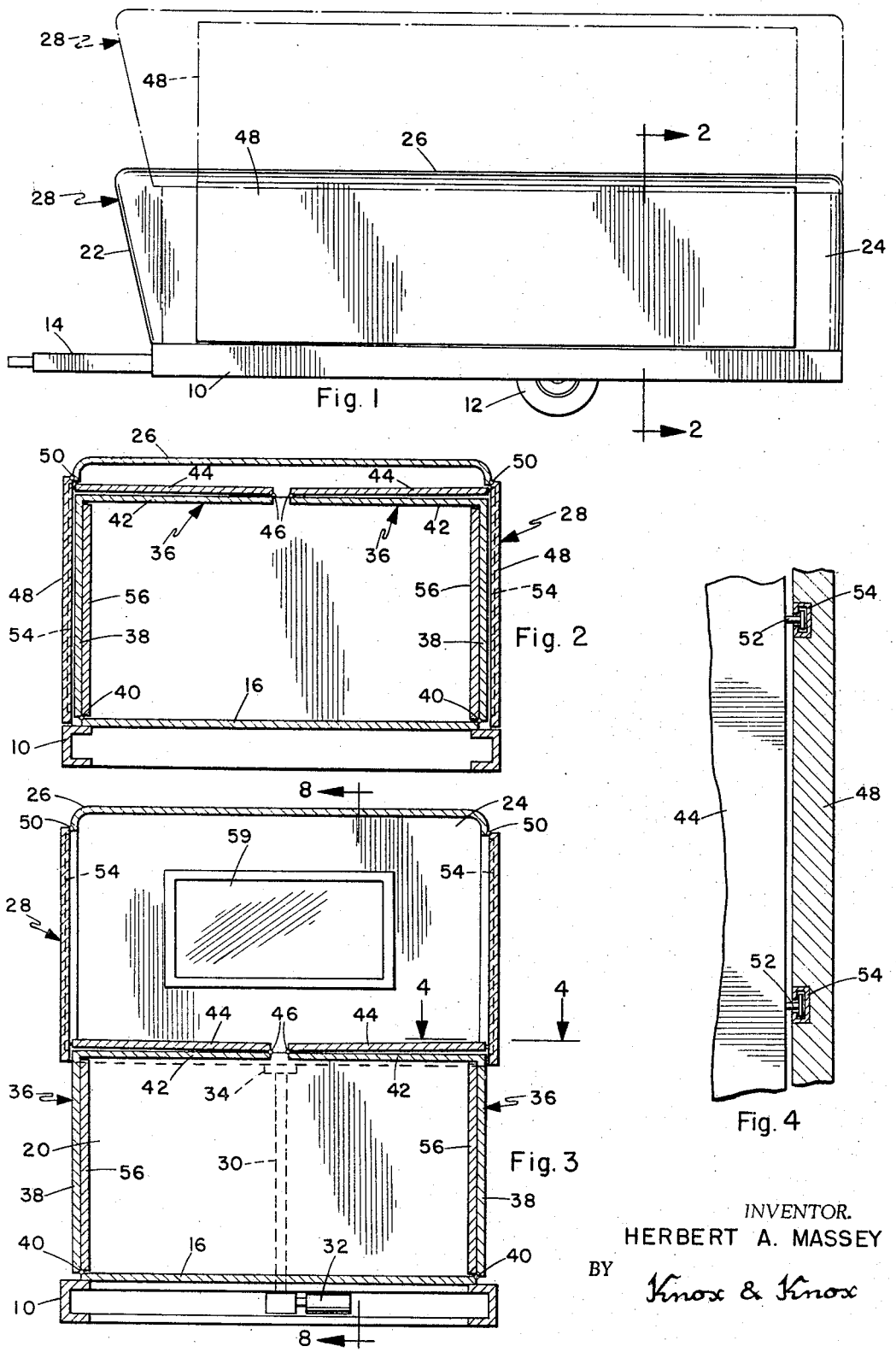

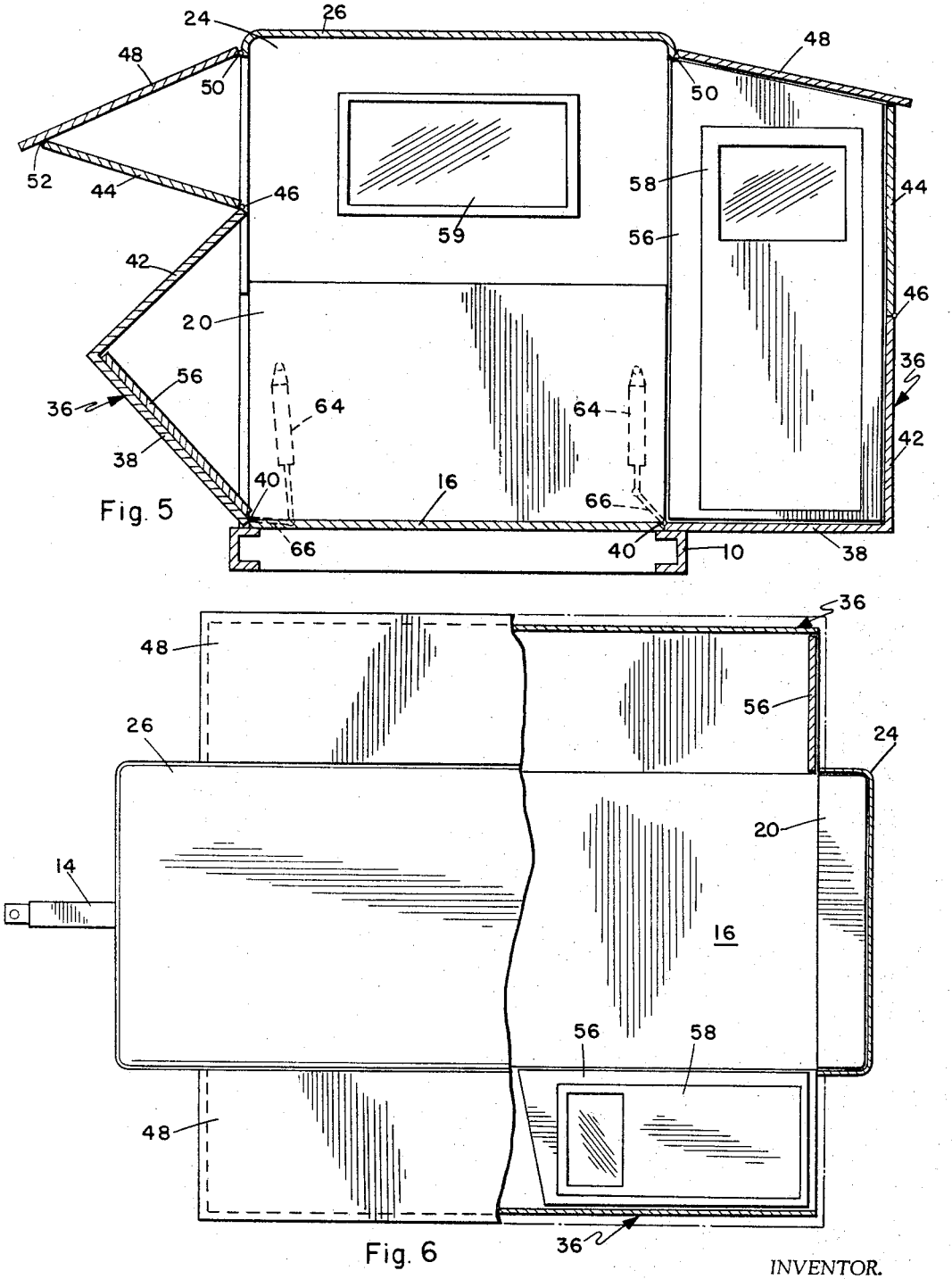

INVENTOR.
HERBERT A. MASSEY
BY Knox & Knox

United States Patent Office 3,343,866
Patented Sept. 26, 1967

3,343,866
COLLAPSIBLE TRAILER
Herbert A. Massey, Rte. 1, Mountain Home, Ark. 72653
Filed Oct. 20, 1965, Ser. No. 498,255
4 Claims. (Cl. 296—27)

ABSTRACT OF THE DISCLOSURE

The collapsible trailer is featured by fold-in lateral units each constituting a floor extension and a lower wall element unitary and rigidly connected therewith, along with complementary upper wall elements hinged to the lower wall elements and slidably connected with roof extensions, so that the roof extensions can be lowered vertically, outside the folded wall elements, when the roof is lowered.

The present invention relates to vehicle towed trailers and more specifically to a collapsible trailer.

Collapsible trailers have been built in various forms. Some have sides which extend laterally to increase floor space, but are the full usable height whether collapsed or extended. Others have tops which can be raised to provide headroom, but are limited in floor space. The types which can be expanded in both height and floor space usually have hinged panels which extend to form portions of the structure, the walls or other portions being filled in with curtains or similar detachable panels. The process of erecting or collapsing such a trailer is time consuming and the structure is often not particularly rigid or weatherproof.

The primary object of this invention, therefore, is to provide a trailer which can be expanded to substantially twice the floor area and height of the collapsed unit, all structure being rigid and moving automatically into position as the operating mechanism is actuated, with no separate panels to be assembled.

Another object of this invention is to provide a trailer which, in collapsed condition, is substantially the same width and height as conventional automobiles, making towing a simple operation compared to handling the usual large trailer.

Another object of this invention is to provide a trailer wherein the collapsed structure leaves almost the entire interior of the trailer clear for storage of furnishings and equipment, the arrangement facilitating permanent installation of cooking and plumbing fixtures which are impractical to move.

A further object of this invention is to provide a trailer which can be expanded or collapsed by power or manually operated means in two basic steps, the operation requiring as little as a minute to complete.

Another object of this invention is to provide a trailer which is adaptable to conventional construction techniques and which can utilize various window and door arrangements.

The trailer structure and its operation are shown in the drawings, in which:

FIGURE 1 is a side elevation view of the collapsed trailer, the initial upward expansion being indicated in broken line;

FIGURE 2 is an enlarged sectional view taken on line 2—2 of FIGURE 1;

FIGURE 3 is a sectional view similar to FIGURE 2, but with the trailer expanded upwardly;

FIGURE 4 is an enlarged fragmentary sectional view taken on line 4—4 of FIGURE 3;

FIGURE 5 is a sectional view similar to FIGURE 3, showing two stages in the lateral expansion of the trailer;

FIGURE 6 is a top plan view of the expanded trailer, with portions cut away;

Similar characters of reference indicate similar or identical elements and portions throughout the specification and throughout the views of the drawing.

Figure 7:
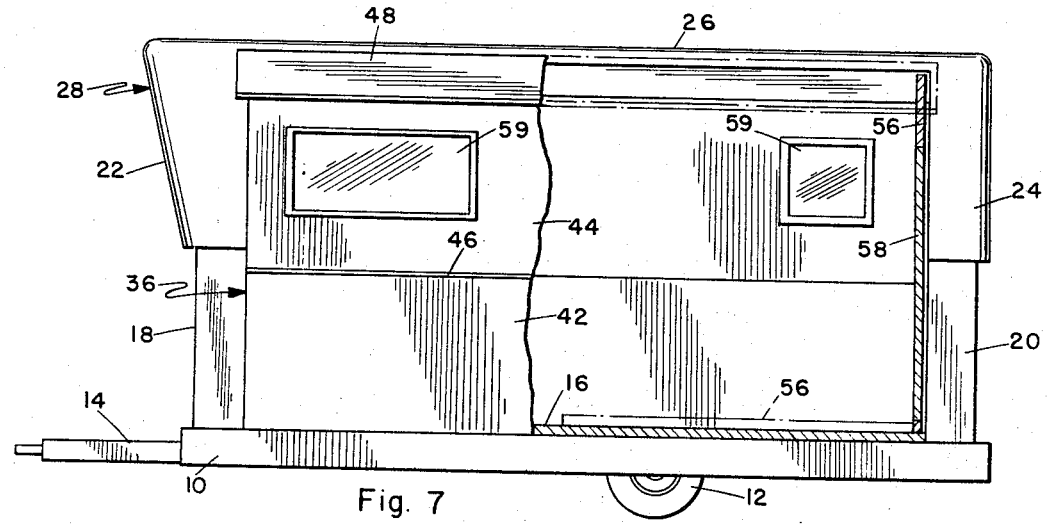
FIGURE 7 is a side elevation view of the expanded trailer, with portions cut away.
Figures 8, 9:
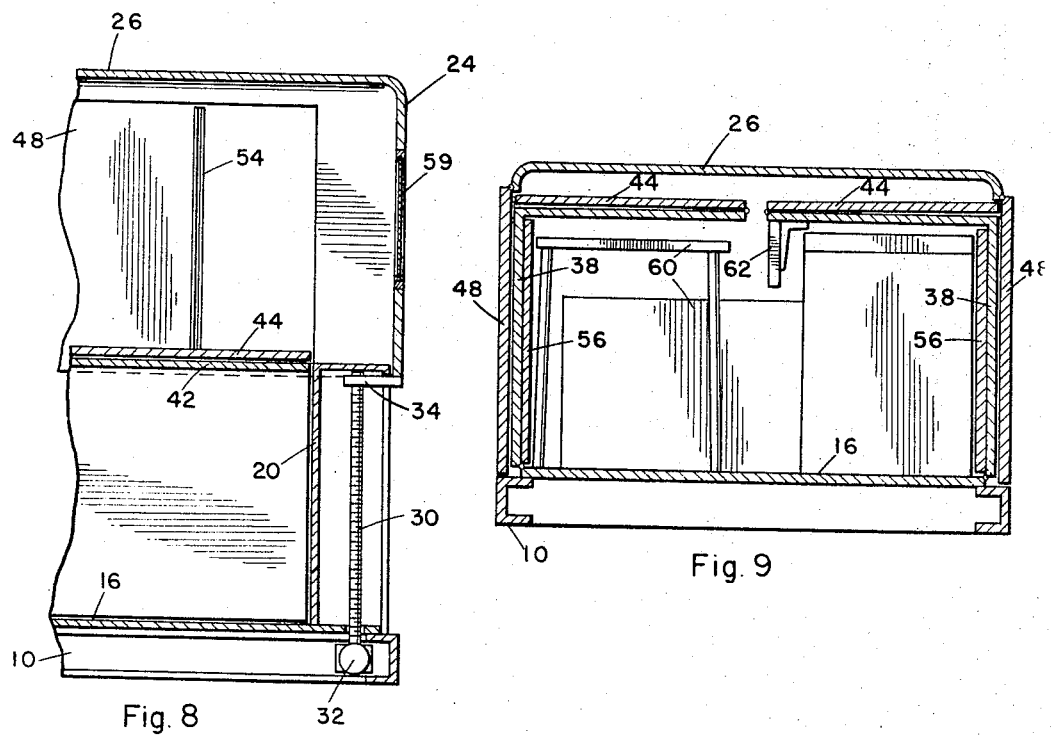
FIGURE 8 is a sectional view taken on line 8—8 of FIGURE 3.
FIGURE 9 is a sectional view similar to FIGURE 2, illustrating internal storage in the collapsed trailer.

The trailer is built on a chassis frame 10 which is provided with wheels 12 and a tow bar 14. The structure of the frame, the wheel suspension and the type of tow bar are not critical and may be of any conventional configuration. Fixed on top of frame 10 is a main floor 16 at the forward end of which is an upright front end section 18, with an upright rear end section 20 at the rear, forming the fixed structure of the trailer body. Vertically slidably mounted on the front end section 18 is a front bay portion 22 and similarly mounted on rear end section 20 is a rear bay portion 24, the bay portions being interconnected at the top by a roof 26 to form the basic structure of the upper body unit 28. In the collapsed position the upper body unit comprises the exterior shell or cover of the trailer and is suitably designed for appearance and air flow characteristics. Various means may be used to raise and lower the upper body unit 28 vertically, FIGURES 3 and 8 showing a screw jack 30 driven by a motor 32 on frame 10, the jack engaging a screw follower 34 on the rear bay portion 24. A similar arrangement is used at the forward end for balanced operation.

At each side of main floor 16 is a wing unit 36 comprising a floor extension 38 attached along its inner edge to said main floor by a longitudinal hinge 40, the outer edge of the floor extension having a lower wall 42 fixed perpendicular thereto. At the upper edge of lower wall 42 is an upper wall 44, attached by a longitudinal hinge 46 to fold flat against the outer surface of said lower wall.

At each side of roof 26 is a roof extension 48 attached by a longitudinal hinge 50 to swing upwardly and outwardly. In the collapsed position the roof extensions 48 hang down and overlap the bay portions 22 and 24 at the ends to form the side closure panels of the trailer. The upper edge of each upper wall 44 has protruding guides 52 which ride in tracks 54 recessed in or attached to each roof extension 48 perpendicular to the hinge axis thereof, as in FIGURE 4. Rollers or other free sliding means may be used, depending on the size and construction of the parts involved.

At each end of each floor extension 38 is an end panel 56 hinged transversely at its lower edge to fold flat against the floor extension. One or more of the end panels 56 may be provided with a door 58, or windows, and any suitable arrangement of windows 59 can be installed in the upper walls 44 and end bays 22 and 24. Specific details of hinges, latches and similar hardware have been omitted, since these are readily available in many different forms.

In the collapsed position the wing units 36 are folded inwardly so that the floor extensions 38 are upright and the lower walls 42 extend inwardly in opposed relation. This arrangement encloses a large inner compartment almost the full size of the collapsed trailer and provides storage space for furnishings, indicated generally at 60 in FIGURE 9. Shelves 62, or other fixtures may be mounted on lower walls 42 and are slidably connected to the roof extensions 48, which hang downwardly on the outside of wing units 36, as in FIGURE 2. The lowered upper body unit 28 completely encloses the trailer which, in this collapsed condition, is substantially the same height and width of a conventional automobile capable of towing such a trailer. This facilitates handling by reducing clearances necessary and by minimizing wind loads, which can become dangerous with full sized trailers.

To expand the trailer the upper body unit 28 is first raised vertically, as in FIGURE 3, the roof extensions 48 sliding upwardly while the upper walls 44 remain in place, so that guides 52 reach the lower or outer ends of tracks 54. Wing units 36 are then swung outwardly and downwardly. This can be accomplished by jacks 64 connected to actuating arms 66 at the hinges 40. Other means such as screw mechanisms, cables, or the like may be equally suitable, depending on the size and structure of the trailer. As each wing unit 36 swings out the upper wall 44 will unfold and push the roof extension 48 upwardly, as in the intermediate position on the left side of FIGURE 5. In the fully open position the floor extensions 38 are coplanar with floor 16 and the upper and lower walls form flat, vertical outer walls. The frame 10 supports the extended floor extensions 38, but additional supporting means may be used if necessary. End panels 56 are raised to fill the openings at the ends of wing units 36, the expanded trailer body then being fully enclosed. Suitable weather seals, not shown, can be installed where necessary.

To collapse the trailer the end panels 56 are first folded down, then wing units 36 are swung inwardly, which reverses the opening action sequence. When the wing units are fully folded the upper body unit 28 is lowered vertically to complete the closing operation.

By opening the trailer in two stages the mechanism is greatly simplified and a small number of large panels can be used, with simple hinges, since the opening motions are not complex.

All of the panels in the trailer body are of rigid construction and are self-supporting at all positions, without the need for insertion of separate braces or other fittings. The simple two stage action of opening the trailer automatically erects the entire structure to form an enclosed body, the raising of the end panels, which are already attached in proper position, being the only manual operation involved. Floor space and head room are substantially double that of the collapsed trailer.

Stabilizing jacks and other trailer accessories of well known types can be used. In storing furnishings and other items inside the trailer, the width of floor 16 between the hinges 40 and the height of end sections 18 and 20 provide indication of the available space, to avoid damage when the trailer is collapsed.

It is understood that minor variation from the form of the invention disclosed herein may be made without departure from the spirit and scope of the invention, and that the specification and drawings are to be considered as merely illustrative rather than limiting.

I claim:
1. A collapsible trailer, comprising:
a frame;
a floor fixed on said frame, said floor having fixed upright end sections thereon;
an upper body unit having a roof with end bay portions depending from opposite ends of said roof, said end bay portions being vertically slidable on said end sections;
a pair of wing units mounted on opposite sides of said floor and extending between said end sections, each of said wing units including a floor extension longitudinally hinged to said floor, and a foldable wall element rigidly secured to the edge of the floor extension remote from the hinge;
roof extensions longitudinally hinged on opposite sides of said roof;
upper end portions of said wall elements being slidably connected to said roof extensions, whereby said roof extensions, along with said roof, can be raised and lowered vertically outside the folded wing units.

2. A collapsible trailer, comprising:
a frame;
a floor fixed on said frame, said floor having fixed upright end sections thereon;
an upper body unit having a roof with end bay portions depending from opposite ends of said roof, said end bay portions being vertically slidable on said end sections;
a pair of wing units mounted on opposite sides of said floor and extending between said end sections, each of said wing units including a floor extension longitudinally hinged to said floor, a lower wall fixed perpendicular to the edge of said floor extension remote from the hinge, and an upper wall longitudinally hinged to the upper edge of said lower wall to fold flat against the lower wall;
roof extensions hinged on opposite sides of said roof to swing outwardly therefrom;
said roof extensions being slidably connected to the upper edges of said upper walls;
means to raise and lower said upper body unit; and
means to swing said wing units inwardly and outwardly.

3. A collapsible trailer according to claim 2 and including end panels mounted on opposite ends of each of said floor extensions, said end panels being hinged transversely to fold flat against the floor extensions.

4. A collapsible trailer according to claim 3, wherein at least one of said end panels has a door therein.

References Cited
UNITED STATES PATENTS

| | | | |
|---|---|---|---|
| 2,148,270 | 2/1939 | Koets | 296—23.7 |
| 2,167,557 | 7/1939 | Stout | 296—23.7 |
| 3,083,047 | 3/1963 | Babbel | 296—26 X |

BENJAMIN HERSH, *Primary Examiner.*

PHILIP GOODMAN, *Assistant Examiner.*